United States Patent
LeBlanc et al.

(10) Patent No.: US 8,418,964 B2
(45) Date of Patent: Apr. 16, 2013

(54) FUEL SUPPLY INSTALLATION OF AN AIRCRAFT TURBOJET

(75) Inventors: Pascal LeBlanc, La Grande Paroisse (FR); José Roland Rodrigues, Nandy (FR)

(73) Assignee: Snecma, Paris (FR)

( * ) Notice: Subject to any disclaimer, the term of this patent is extended or adjusted under 35 U.S.C. 154(b) by 56 days.

(21) Appl. No.: 12/961,955

(22) Filed: Dec. 7, 2010

(65) Prior Publication Data
US 2011/0243772 A1   Oct. 6, 2011

(30) Foreign Application Priority Data
Dec. 7, 2009   (FR) ...................................... 09 58701

(51) Int. Cl.
*B64C 17/10*   (2006.01)
*B64C 37/14*   (2006.01)

(52) U.S. Cl.
USPC ........................ 244/135 C; 417/287; 417/426

(58) Field of Classification Search .................. 417/287, 417/296, 426, 428; 244/135 R, 135 C, 53 R; 60/734
See application file for complete search history.

(56) References Cited

U.S. PATENT DOCUMENTS

| | | | | | |
|---|---|---|---|---|---|
| 2,916,875 | A | * | 12/1959 | Morley et al. | 60/39.281 |
| 4,208,871 | A | * | 6/1980 | Riple, Jr. | 60/39.281 |
| 4,245,964 | A | * | 1/1981 | Rannenberg | 417/287 |
| 4,915,593 | A | * | 4/1990 | Cygnor | 417/245 |
| 5,110,269 | A | * | 5/1992 | Fallon | 417/428 |
| 5,118,258 | A | * | 6/1992 | Martin | 417/3 |
| 7,401,461 | B2 | * | 7/2008 | Eick et al. | 60/39.091 |
| 2006/0266047 | A1 | | 11/2006 | Eick et al. | |
| 2008/0289338 | A1 | | 11/2008 | Desai | |

FOREIGN PATENT DOCUMENTS

| | | |
|---|---|---|
| EP | 1 726 879 A2 | 11/2006 |
| EP | 1 726 879 A3 | 11/2006 |
| WO | WO 2007/044020 A2 | 4/2007 |
| WO | WO 2007/044020 A3 | 4/2007 |

OTHER PUBLICATIONS

Search Report issued Jul. 9, 2010, in French Patent Application No. 730718 (with English translation of Category of Cited Documents).

* cited by examiner

*Primary Examiner* — Peter J Bertheaud
(74) *Attorney, Agent, or Firm* — Oblon, Spivak, McClelland, Maier & Neustadt, L.L.P.

(57) ABSTRACT

A fuel supply installation for a turbojet including two volumetric pumps for combining their flow rates is disclosed. The pumps include a main pump dimensioned for the full gas rate and an auxiliary pump controlled and dimensioned to provide the supplementary flow rate necessary on ignition.

6 Claims, 1 Drawing Sheet

FUEL SUPPLY INSTALLATION OF AN AIRCRAFT TURBOJET

BACKGROUND OF THE INVENTION

1. Field of the Invention

The invention relates to fuel supply installation of an aircraft turbojet and more particularly relates to a refinement for optimising components, especially in terms of weight and bulk, while reducing mechanical and thermal losses resulting from recirculation of excess fuel at different operating rates of the turbojet.

2. Description of the Related Art

In an aircraft turbojet, the main high-pressure pump supplying fuel to the combustion chamber is of volumetric type, for example a gear pump. This type of pump has a linear flow characteristic as a function of the speed at which it is driven. The pump is conventionally dimensioned so that said flow characteristic can satisfy all operating rates. The crucial point is the flow rate necessary on ignition. This dimensioning point therefore determines a linear characteristic of relatively high given slope such that the curve representative of the fuel flow rate as a function of the operating rate of the turbojet is at any point below the straight line passing through this dimensioning point.

It eventuates that the pump must be able to ensure a relatively substantial flow rate (the pump is therefore heavier and bulkier than necessary) and that it is imperative to permanently recycle a considerable quantity of fuel, at any operating rate of the turbojet. The result is a drop in excess mechanical power on the gearbox of the turbojet and thermal losses due to recirculation of excess fuel.

U.S. Pat. No. 5,110,269 describes a system using a double pump, driven mechanically. According to the operating rate of the motor, the flow rate of one of the stages of the double pump can be restarted and recycled. This solution does not allow for the preferred optimisation.

BRIEF SUMMARY OF THE INVENTION

The invention relates to a fuel supply installation of an aircraft turbojet comprising two volumetric pumps connected to combine their flow rates, characterised in that these pumps are:

- a main pump driven mechanically and dimensioned as a function of the fuel needs of said turbojet at the full gas rate, and
- a controlled auxiliary pump, dimensioned as a function of fuel needs of said turbojet on ignition, given the flow rate ensured at this rate by said main pump, and in that said auxiliary pump is driven selectively, especially on ignition.

The installation most preferably comprises a specific controlled electric motor, powering said auxiliary pump. Consequently, the flow rate of this auxiliary pump is constantly adjustable by controlling the rotation speed of the electric motor, to supplement any possible discrepancy in flow rate of the main pump, driven by the turbojet, at any operating rate of the latter. So, commissioning this electric motor under the control of an onboard computer simply reinforces the overall fuel flow rate, especially on ignition, by boosting the fuel flow rate delivered by the main pump by the required quantity. On completion of the ignition phase, the auxiliary pump is decommissioned by stopping the electric motor, and the flow rate is ensured by the only main pump whereof the dimensioning point corresponds to the full gas rate of the turbojet.

According to a possible embodiment, the main and auxiliary pumps are connected in parallel.

Advantageously, the two pumps are connected to the outlet of a booster pump, typically of centrifuge type.

According to one embodiment, the outputs of said pumps are connected to a regulator controlled by the computer to redirect the excess part of the overall fuel flow rate to a fuel tank in function of the operating rate of the turbojet. The booster pump removes the fuel in this tank to feed said main and auxiliary pumps.

BRIEF DESCRIPTION OF THE DRAWINGS

The invention will be better understood and other advantages thereof will emerge more clearly from the following description, given solely by way of example and given in reference to the attached diagrams, in which.

DETAILED DESCRIPTION OF THE INVENTION

Figure 1:
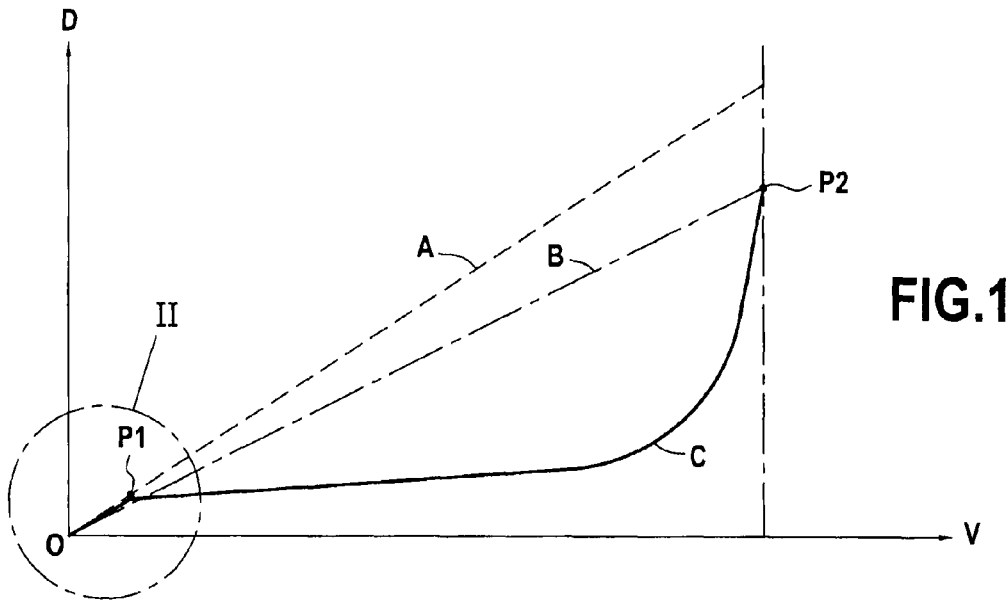
FIG. 1 is a graph illustrating characteristics of pump flow rate as a function of the rate of a turbojet, for two selected dimensioning points, as well as the operating curve of the turbojet itself.
Figure 2:
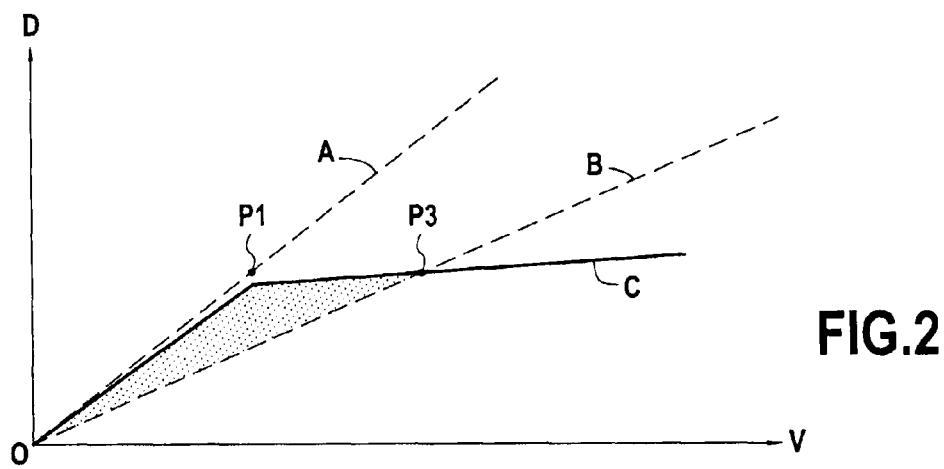
FIG. 2 is an enlargement of the framed panel II of the graph of FIG. 1.

In FIGS. 1 and 2, the straight line A represents a linear characteristic of a volumetric pump whereof the dimensioning point $P_1$ corresponds to the ignition of the turbojet. The drive speed of the pump is given in abscissa and the flow rate is given in ordinates. The straight line B represents a characteristic of a volumetric pump, of identical nature but of lower flow rate whereof the dimensioning point $P_2$ corresponds to the full gas rate of the turbojet. The curve C as such represents the consumption characteristic of the turbojet at all operating rates. It appears that the critical point $P_1$ corresponds precisely to the ignition of the turbojet, as the pump is driven at a relatively low speed and can provide the required flow rate only if it is dimensioned widely as per characteristic A. In these conditions, it is clear that at the full gas rate (point $P_2$) of the turbojet, the flow rate of the pump is around 30% greater than what is strictly necessary to ensure correct feed of the turbojet.

It must therefore be ensured that excess fuel returns to the tank. It is therefore best to have a pump, hereinbelow called "main pump" in accordance with characteristic B for which it is strictly dimensioned (in fact with a safety margin) as a function of fuel needs of the turbojet at full gas rate. Proceeding this way economises on energy by reducing the quantity of fuel returned to the tank, at any operating rate. However, as shown in FIG. 2, the main pump dimensioned in this way is incapable of ensuring it itself of the flow rate necessary for ignition. The grey zone in FIG. 2 represents the flow rate to be completed for low rotation speeds of the turbojet.

Figure 3:
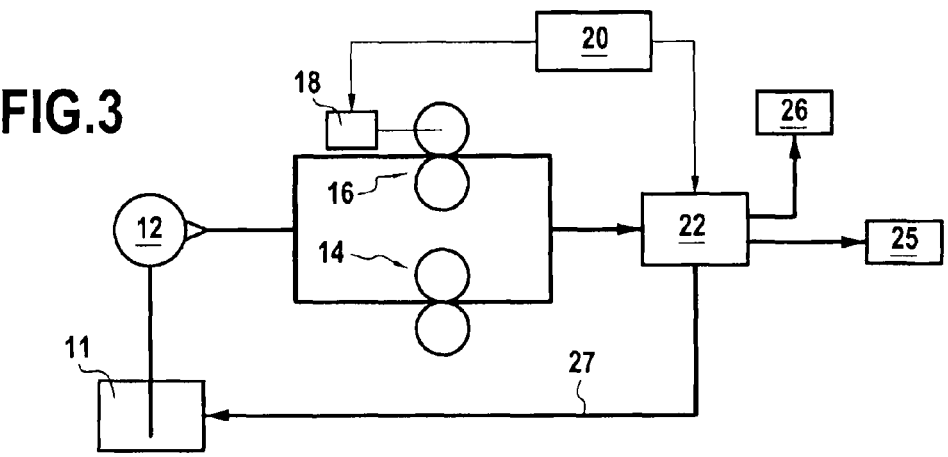
FIG. 3 is a diagram of the supply installation according to the invention.

FIG. 3 illustrates an embodiment of the invention. The fuel is stored in a tank 11 and removed by a booster pump 12 of centrifuge type, which feeds two volumetric geared pumps whereof the hydraulic circuits are in parallel. There is a main pump 14 driven mechanically by the gearbox of the turbojet and an auxiliary pump 16 driven by an electric motor 18. The electric motor is controlled by the computer 20 managing the admission of fuel to the combustion chamber (computer commonly known as FADEC, in the technology). The outlets of the two pumps are connected to the inlet of a regulator 22, itself controlled by the computer 20. An outlet of the regulator is connected to the injection circuit 25 of the combustion chamber and another outlet controls servo-valves and actuators 26 to activate various devices necessary for controlling the turbojet, for example, for controlling the rams of the control systems with fixed blades of variable pitch.

The excess fuel relative to needs is reinjected, controlled by the regulator 22, via a fluid line 27 to tank 11.

The main pump 14 is dimensioned as a function of fuel needs of the turbo-reactor at full gas rate. In other words, its dimensioning point is point P2 and its characteristic is the straight line $OP_2$. The auxiliary pump 16 is dimensioned and controlled such that its flow rate, added to the one of the main pump "follows" the straight line $OP_1$, or has a slope at least equal as far as point $P_1$ and "follows" the curve C as far as point $P_3$.

Operation flows evidently from the preceding description. At the time of ignition, the two pumps 14, 16 are driven in rotation, one by the gearbox of the turbojet and the other by the electric motor, with the result that the flow rate at the intake of the regulator substantially follows characteristic A at low drive speeds by the starter, to the point of ignition $P_1$ and beyond, as far as point $P_3$ where the contribution of the auxiliary pump 16 becomes useless. From this rate, the computer controls the stopping of the electric motor 18 and of the auxiliary pump 16 such that the flow rate at the intake of the regulator 22 depends only on the linear characteristic B of the main pump. Beyond point $P_3$, the flow rate continues to progress as a function of the rate of the motor by following the curve $OP_2$. At the full gas-operating rate ($P_2$), the flow rate of the pump 14 is in principle sufficient to ensure supply to the turbojet and the volume of fuel rerouted to the tank is very small. It should be noted that if needed, the auxiliary pump 16 could immediately be returned to service, under the control of the computer to meet an increased fuel demand. This is especially the case for a restart of the turbojet, in flight.

The invention claimed is:

1. A fuel supply installation of an aircraft turbojet comprising:
    two volumetric pumps connected to combine their flow rates, the pumps including:
        a main pump driven mechanically by the turbojet and configured to supply substantially the required amount of fuel at a full gas rate of said turbojet; and
        a controlled auxiliary pump, configured to add additional fuel to said turbojet on ignition, so that the total fuel flow from both pumps is sufficient to provide the required amount of fuel for ignition; and
    a controller configured to selectively drive said auxiliary pump from startup to an ignition point of said turbojet, wherein said controller is configured to stop said auxiliary pump at an auxiliary pump stop drive speed which is faster than a drive speed of the ignition point of said turbojet, the auxiliary pump stop drive speed being a drive speed at which said auxiliary pump does not contribute to a flow rate of fuel at an intake of a regulator.

2. The installation as claimed in claim 1, further comprising a specific electric motor which is controlled to power said auxiliary pump.

3. The installation as claimed in claim 1, wherein said main and auxiliary pumps are connected in parallel.

4. The installation as claimed in claim 1, wherein inlets of the two volumetric pumps are connected to an outlet of a booster pump.

5. The installation as claimed in claim 4, wherein said booster pump is of the centrifuge type.

6. The installation as claimed in any one of the preceding claims, wherein outputs of said volumetric pumps are connected to said regulator controlled to redirect an excess part of the overall flow rate of fuel to a fuel tank based on an operating rate of the turbojet.

* * * * *